United States Patent
Margalit

(10) Patent No.: US 8,077,625 B1
(45) Date of Patent: Dec. 13, 2011

(54) APPARATUS AND METHOD FOR USING A COMMUNICATION RESOURCE FOR PERFORMING A TIMING OPERATION

(75) Inventor: Ilan Margalit, Tel-Aviv (IL)

(73) Assignee: National Semiconductor Corporation, Santa Clara, CA (US)

( * ) Notice: Subject to any disclaimer, the term of this patent is extended or adjusted under 35 U.S.C. 154(b) by 1394 days.

(21) Appl. No.: 11/171,622

(22) Filed: Jun. 30, 2005

(51) Int. Cl.
*G01R 31/08* (2006.01)

(52) U.S. Cl. ........ 370/252; 370/471; 370/472; 370/476; 370/503; 370/505; 709/228; 709/232; 709/236; 709/237

(58) Field of Classification Search .................. 370/241, 370/252, 253, 470–476, 503, 520, 505, 506, 370/509, 512, 514; 709/228, 232, 236, 237
See application file for complete search history.

(56) References Cited

U.S. PATENT DOCUMENTS

| | | | | |
|---|---|---|---|---|
| 4,486,326 A * | 12/1984 | Gutierrez et al. | ............. | 508/278 |
| 4,881,221 A * | 11/1989 | Schroeder et al. | ............. | 370/287 |
| 5,086,467 A * | 2/1992 | Malek | ............. | 380/252 |
| 5,187,707 A * | 2/1993 | Chu et al. | ............. | 370/236 |
| 5,612,961 A * | 3/1997 | Cabezas et al. | ............. | 714/715 |
| 5,703,902 A * | 12/1997 | Ziv et al. | ............. | 375/228 |
| 5,887,050 A * | 3/1999 | Fenske et al. | ............. | 379/4 |
| 6,240,151 B1 * | 5/2001 | Ko | ............. | 375/370 |
| 6,647,440 B1 * | 11/2003 | Birns et al. | ............. | 710/29 |
| 7,353,300 B2 * | 4/2008 | Schumacher | ............. | 710/30 |
| 7,418,031 B2 * | 8/2008 | Jha et al. | ............. | 375/225 |
| 2001/0043567 A1 * | 11/2001 | Franz et al. | ............. | 370/241 |
| 2002/0121921 A1 * | 9/2002 | Rupp et al. | ............. | 327/158 |
| 2004/0240388 A1 * | 12/2004 | Albion et al. | ............. | 370/252 |
| 2006/0274667 A1 * | 12/2006 | Mir et al. | ............. | 370/252 |

* cited by examiner

*Primary Examiner* — Christopher Grey

(57) ABSTRACT

A method for using a non-timer dedicated resource, such as a communication resource, for performing timing operations is provided. The method is advantageous for use with embedded applications in dedicated devices having limited timing resources, particularly in cases where the existing timing resources have all been allocated to specific tasks and are not available to accommodate further timing requirements.

20 Claims, 2 Drawing Sheets

APPARATUS AND METHOD FOR USING A COMMUNICATION RESOURCE FOR PERFORMING A TIMING OPERATION

TECHNICAL FIELD OF THE INVENTION

The present invention relates to time measurement and, more particularly, to an apparatus and method for using a communication resource for performing a timing operation.

BACKGROUND OF THE INVENTION

Embedded applications within dedicated devices frequently require timing operations for diverse functions. Often, this requirement is met by utilizing independent timer resources. Many commonly available devices for handling embedded applications, such as programmable controllers, are configured with dedicated internal timing modules to address such a need.

Timing operations include, but are not limited to: measuring elapsed time; providing notification of the elapsing of a predetermined amount of time; providing periodic notifications of the elapsing of predetermined time intervals; notification that a particular time has been reached (also referred to as "time-keeping"); and answering requests for the current time (also referred to as a "real-time clock"). A non-limiting example of notification of the elapsing of a predetermined amount of time is a signal that 30 seconds have elapsed since sending a message without receiving a response, in order to terminate an open connection that has "timed-out". A non-limiting example of notification that a particular time has been reached is an alarm that it is now 1:30 am, a time designated to perform a scheduled data backup.

A current example of a controller configured with dedicated internal timing modules is the National Semiconductor PC87591L-N05 Mobile Embedded Controller, as described in the published National Semiconductor datasheet for the controller. This device contains two separate timing modules, including a 16-bit "Multi-function timer" (MFT16) and a "Timer and Watchdog" (TWD) module. These modules are intended to support a variety of different timing purposes and functions. The MFT16 module, for example, contains two 16-bit programmable timers, which may be used independently for general-purpose timing requirements. The TWD, on the other hand, is generally used for timing periodic functions and for performing watchdog protection to guard against erroneous software execution (for example, a software routine that does not handle a particular condition and thus does not terminate properly). Other devices similar to the PC87591L-N05 Mobile Embedded Controller are also generally configured with timer resources for a variety of timing-related purposes.

It sometimes happens, however, that a particular application for a dedicated controller exhausts the available timer resources present in a device. For example, the PC87591L-N05 Mobile Embedded Controller as detailed above has three independent timer resources. If a fourth timer resource was needed by an application, this particular device would ordinarily be unable to fully support that application. This can have undesirable consequences for a device that lacks sufficient timer resources to fully support a field-downloaded application that requires timing resources in excess of that which the device normally has available.

There is thus a need for, and it would be highly advantageous to have, an apparatus and method where a dedicated controller device for embedded applications can support the need for timer resources in excess of the normally available timer resources.

BRIEF DESCRIPTION OF THE DRAWINGS

The invention is herein described, by way of example only, with reference to the accompanying drawings, in which like reference numerals represent like parts, and in which.

DETAILED DESCRIPTION

Figure 1:
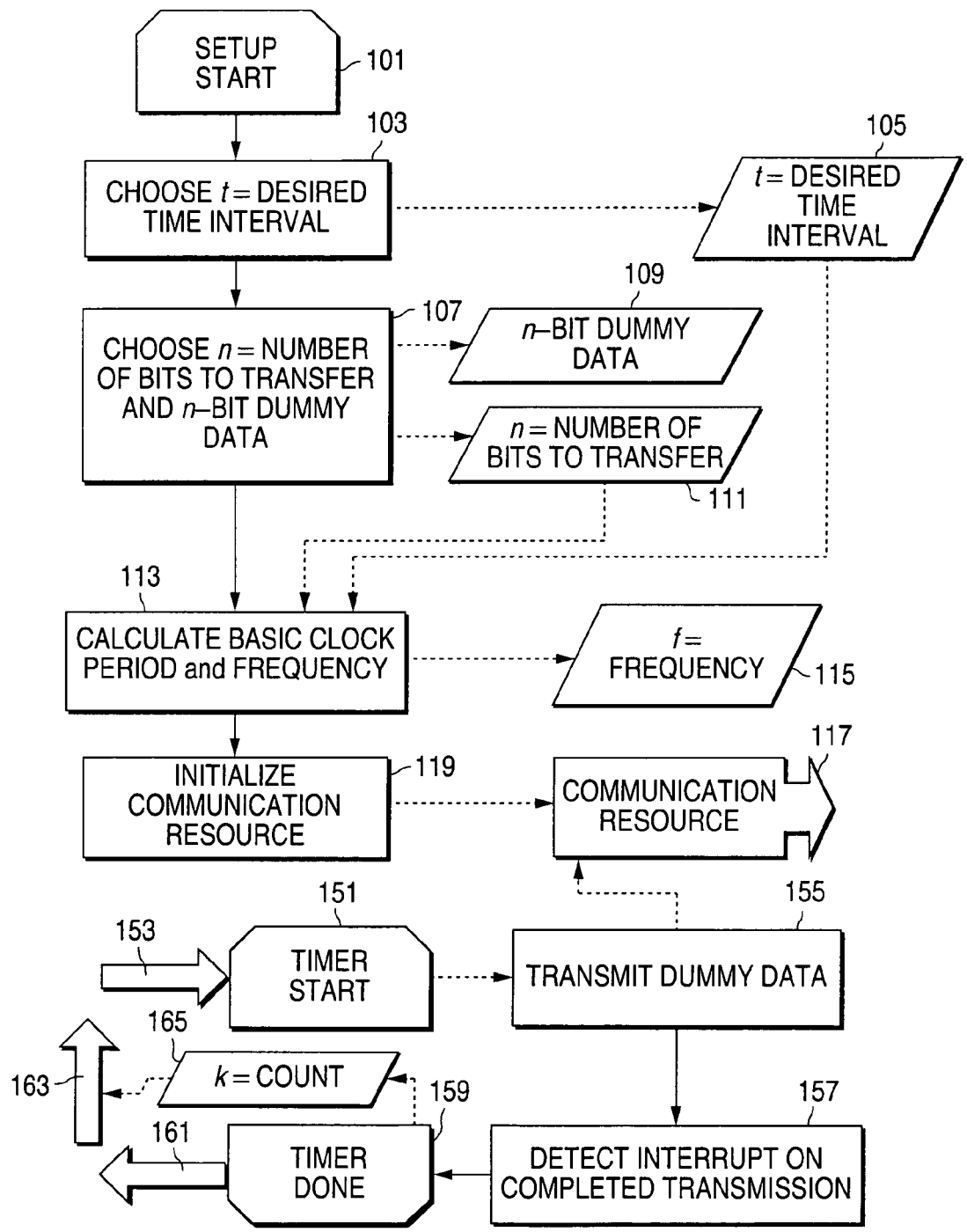
FIG. 1 is a method flowchart according embodiments of the present invention.
Figure 2:
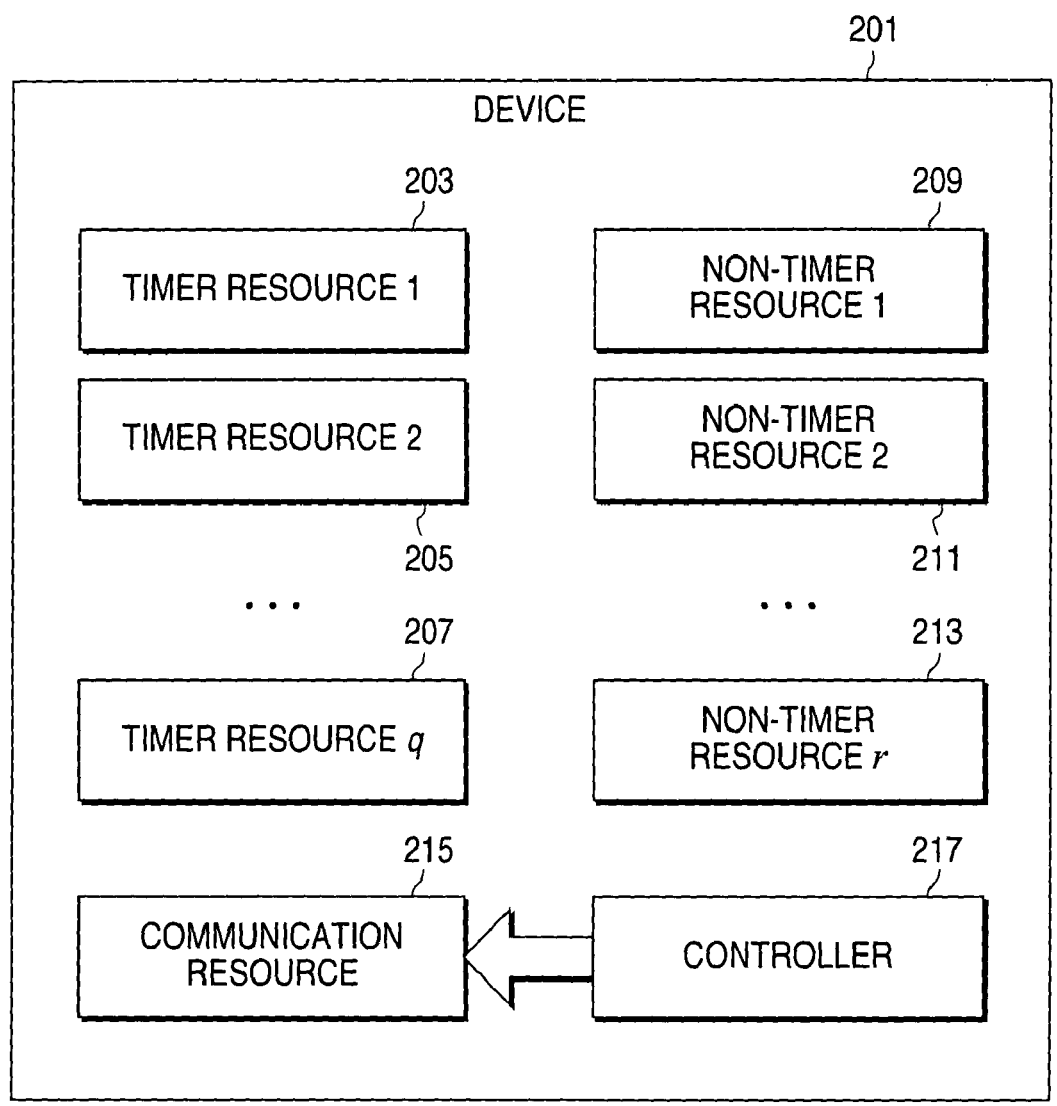
FIG. 2 is a conceptual block diagram of a dedicated device with a communication resource for use in timing operations according to embodiments of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system or device.

To address the above-discussed deficiencies of the prior art, an object of the present invention is to provide a method for utilizing a non-timer dedicated resource of a device as a timing resource.

It is an objective of the present invention to make an additional timing resource available to a device.

It is also an objective of the present invention to enable a device to perform timing operations when the dedicated timing resources normally available to that device are not available.

It is an additional objective of the present invention to permit adjustment of the time parameters of the timing operations. It is a further objective of the present invention to provide timing signals at regular time intervals.

Embodiments of the present invention utilize various non-timer dedicated resources as timing resources, including but not limited to: communication resources; A/D converters; D/A converters; arithmetic co-processors; and cryptographic co-processors. The present invention makes use of the fact that certain dedicated non-timer resources carry out their functions according to well-regulated time sequences and can be calibrated for use in performing timing operations. A characteristic of using a dedicated non-timer resource to perform timing operations is that the intended function of the dedicated non-timer resource is not utilized. For example, when using analog-to-digital conversion resources for timing, the data and/or analog signals to be converted are not used for any purpose other than determining the parameters of the desired timing operation.

The present invention is herein illustrated in embodiments of a method for utilizing a communication resource of a dedicated controller as a timing resource.

Therefore, according to the present invention, there is provided a method of using a communication resource of a device for performing a timing operation, the communication resource being operative to transmit data and having a signal upon completion of transmitting data, the communication resource having a bit clock period, the method including: (a) preparing data having a specified number of bits; (b) transmitting the data using the communication resource; (c) detecting the signal from the communication resource upon completion of transmitting data; and (d) upon the detecting the signal of the communication resource, indicating the elapsing of a time substantially equal to the bit clock period times the specified number of bits; wherein the indicating is used in performing the timing operation, and wherein the indicating is not utilized by the communication resource.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

The principles and operation of a method according to the present invention may be understood with reference to the drawings and the accompanying description.

FIG. 1 is a method flowchart illustrating an embodiment of the present invention, whereby a communication resource 117 is used for indicating the elapsing of a time interval. First, communication resource 117 is set up (or configured) through a process beginning at a setup start point 101. In a step 103, the desired time interval t is chosen and stored in a data storage location 105. The time interval is also known as the "time base". In a non-limiting example of employing the method herein illustrated, t is chosen as 5 milliseconds or 0.005 seconds.

Next, in a step 107, a number n of bits to transfer is chosen, where n is stored in a data storage location 111; and n bits of data are used. In an embodiment of the present invention, n bits of dummy data are generated. As the term "dummy data" implies, the value of the dummy data is unimportant and can be any value whatsoever. The dummy data is not used after completion of the method according to the present embodiment of the present invention, and thus the value of the dummy data has no significance. Dummy data is thus "arbitrarily selected," with no reason to prefer one value over another. In an embodiment of the present invention, the dummy data is stored in a data storage location 109. In another embodiment of the present invention, the dummy data is generated according to a formula or rule and does not need to be stored. In a non-limiting example of this embodiment, the dummy data bits are all zero (i.e., n zeros). In the non-limiting example as begun above, n=8.

Next, in a step 113, a bit clock period and basic clock frequency are calculated. The bit clock period is the time needed for communication resource 117 to process a single bit of data. The bit clock period is not necessarily an explicit parameter defined for the device, nor is the bit clock period necessarily a constant. The bit clock period moreover may be calculated as an average value over multiple bits. In embodiments of the present invention, the bit clock period may be adjusted by setting certain parameters of the communication resource. The calculation is done according to Equation (1), below:

$$\tau = t/n \quad (1)$$

where $\tau$ is the bit clock period as defined above, and t is the time needed to process n bits of data. In addition, $$f = 1/\tau \quad (2)$$

where f is defined as the basic clock frequency. In an embodiment of the present invention, the basic clock frequency is ultimately derived from the device system clock. In the non-limiting example as previously illustrated, $\tau = 0.005/8 = 0.000625$ sec., and $f = 1,600$ Hz. In an embodiment of the present invention, the frequency if is stored in a data storage location 115.

Finally, in a step 119, communication resource 117 is initialized to exhibit the calculated values for the basic clock frequency or equivalently the bit clock period (based on Equation (2) above). Thus, after being initialized in this manner, when communication resource 117 transmits n bits of data (such as the dummy data, as previously described), the elapsed time for this transmission may be t.

In addition to setting the basic clock frequency or equivalently the bit clock period as described herein, it may also be necessary to enable certain interrupts of communication resource 117 so that an interrupt will be signaled after a data transmission is complete. As described below, this interrupt, or a signal equivalent thereto, may be necessary for the timer function to operate properly.

The foregoing steps may be necessary only for initializing communication resource 117 for the desired time interval t. Once these settings are made, the foregoing steps may need to be repeated only if there is a change in the desired time interval t.

In an embodiment of the present invention, the existing basic clock frequency if of communication resource 117 is not changed, in which case the bit clock period $\tau$ is considered as predetermined and is given by:

$$\tau = 1/f \quad (3)$$

and hence the time interval t is given by:

$$t = n*\tau \quad (4)$$

In still another embodiment of the present invention, the number of bits n of the dummy data is also not changed, and so the time interval t is considered as predetermined and is given by Equation (4).

The characteristics of communication resource 117 may include a multi-rate capability so that the time interval t may be set by changing the basic clock frequency if as described above.

It is emphasized that the time interval t according to the present invention may not be directly utilized in any manner by communication resource 117. That is, time interval t may be utilized only for performing timing operations, which are external to communication resource 117. The present invention makes use of the clock mechanism of communication resource 117, but in such a way that the timing operation performed by embodiments of the present invention is not utilized in any direct manner by communication resource 117. In other words, the timing operations performed by embodiments of the present invention are not necessary in any fashion for the operation of communication resource 117. In particular, the -signaling of the elapsing of time interval t may not be utilized by communication resource 117.

According to embodiments of the present invention, only the transmitting capabilities of communication resource 117 may be utilized. The receiving capabilities, if any, may not be utilized. Thus, it may not be necessary for communication resource 117 to have receiving capabilities. It is further emphasized that it may not be necessary to specify a receiver for the transmissions from communication resource 117, nor is it necessary to have a receiver at all.

To use communication resource 117 as a timer for obtaining a time interval t, a timer start is initiated at a point 151, such as by an incoming signal 153, after which a dummy data transmission is performed in a step 155. As noted previously, no destination (receiver) for the transmission need be specified because the dummy data may not be used after the transmission is complete. At the end of the transmission, an interrupt is signaled by communication resource 117. Typically, communication resources in general, such as communication resource 117, signal an interrupt on transmit buffer empty, a condition that occurs as soon as the dummy data has been transmitted. In a step 157, the interrupt on completed transmission is detected, concluding the timing interval at a point 159, which may signal an outgoing signal 161.

Variations

According to an embodiment of the present invention, the method as described above can automatically repeat, via a continuous retriggering 163 (FIG. 1). In this embodiment, output signal 161 occurs at regular time intervals.

According to another embodiment of the present invention, the method as described above can be retriggered automatically up to a preset number of cycles, via a countdown set by a number k in a data storage location 165. In a non-limiting example of this embodiment, a time interval of 10 msec can be generated by setting k=2 with t=5 msec, as detailed previously.

According to a further embodiment of the present invention, the method as described above can be performed a multiple number of times using more than one initialization. In this embodiment, different time intervals can be employed in the multiple operations. In a non-limiting example of this embodiment, a time interval of 11 msec can be generated by setting k=2 with t=5 msec, as detailed previously, and then setting k=1 with t=1 msec.

According to yet another embodiment of the present invention, timing measurements can be performed by counting the number of time intervals that elapse during a specific condition. Counter k in data storage location 165 can be incremented and then queried to find how many cycles have transpired. In a non-limiting example, counter k in data storage location 165 is first set to zero, and communication resource 117 is initialized for t=5 msec, as detailed previously, with retriggering 163 enabled. Then, at the start of the condition whose time is to be measured, timer start 151 is begun via signal 153. When the condition whose time is to be measured has completed, counter k is read. In this non-limiting example, k=173, so that the total elapsed time T is read to within a resolution of t=5 msec, and is given by 173*5 msec$\leq$T<174*5 msec, or 0.865 sec$\leq$T<0.870 sec.

FIG. 2 conceptually illustrates a device 201 containing a first timer resource 203, a second timer resource 205, and a qth timer resource 207. There are also non-timer resources in device 201, including a first non-timer resource 209, a second non-timer resource 211, and an rth non-timer resource 213. Embodiments of the present invention are able to use these non-timer resources, such as a communication resource 215 and a controller 217, to perform timing operations in the event that none of the timer resources 203, 205, . . . , or 207 are available.

Still further embodiments of the present invention provide for a computer program product for performing the previously-described methods, including software functions, procedures, and utilities, whereby timing operations according to the above-described embodiments of the present invention can be easily incorporated into software by programmers, without having to explicitly deal with communication resources and communications parameters.

Example of Code

The following is an example of C-code for implementing the above method, according to an embodiment of the present invention. This example is applicable to the National Semiconductor PC87591L-N05 Mobile Embedded Controller but has general relevance to any control device having a Universal Synchronous/Asynchronous Receiver-Transmitter (USART) or substantially-equivalent communication resource:

```
/*-------------------------------*/
/* usart interrupt handler       */
/*-------------------------------*/
void usart_handler(void)
{
   if (count<=100)
      count++;
   else
   {
      <DO_WHAT_YOU_NEED>
      count=0;
   }
   <clear interrupt>
   UTBUF=0x55; // Re-trigger transmission of data
   return;
}
int main (void)
{
   <install interrupt handler>
   <unmask relevant interrupt>
   // Configure USART
   // Baud rate = SYS_clock/(16 x N x P)
   // N = value of the baud rate divisor +1
   // P = is the pre scaler divide factor selected by
       the value in the PSR register
   UPSR = 0x1F << 3;                  // P = 16
   UBAUD = 79;                        // N = 80;
   <Enable interrupt on transmit buffer empty>
   <Set to nine bit mode>
   count = 0;
   UTBUF = 0x55;
   while(1);
} /* end */
```

In the above code example, angle brackets < >denote pseudo-code, meaning statements appearing within angle brackets are to be replaced by real code dependent on the application, the available function libraries, and the specific hardware used to perform the timing operation.

Configuration Options

Table 1 below lists some configuration parameter options for a typical USART in a dedicated controller:

TABLE 1

| Configuration Parameters | | | |
|---|---|---|---|
| Parameter | Value | Units | Comments |
| System clock frequency | 10 | MHz | Insert the one used |
| System clock period | 0.1 | μsec | Calculated = 1/System clock frequency |
| Min bits per transmission | 9 | bits | Per spec |

TABLE 1-continued

Configuration Parameters

| Parameter | Value | Units | Comments |
|---|---|---|---|
| Max bits per transmission | 12 | bits | Per spec |
| Min BR cycles per transmission | 144 | cycles | Calculated = Min bits per transmission * 16 |
| Max BR cycles per transmission | 192 | cycles | Calculated = Max bits per transmission * 16 |
| Min pre-scale factor | 1 | | Per spec |
| Max pre-scale factor | 16 | | Per spec |
| Min BR divisor | 1 | | Per spec |
| Max BR divisor | 2048 | | Per spec |
| Min duration of transmission | 0.0144 | Msec | Calculated = System clock period * Min BR cycles per transmission * Min pre-scale factor * Min BR divisor |
| Max duration of transmission | 629.1456 | Msec | Calculated = System clock period * Max BR cycles per transmission * Max pre-scale factor * Max BR divisor |

Table 2 below is an example of selecting the USART configuration settings to achieve a desired time interval of 10 msec.

TABLE 2

Calculation of settings for desired period

| Parameter | Value | Units | Comments |
|---|---|---|---|
| Desired interval | 10 | Msec | Target value |
| System clock frequency | 10 | MHz | Given |
| System clock period | 0.1 | μsec | Calculated = 1/System clock frequency |
| Bits per transmission | 12 | Bits | 9 to 12 in steps of 1 |
| BR cycles per transmission | 192 | cycles | Calculated = Bits per transmission * 16 |
| Pre-scale factor | 1 | Decimal | 1 to 16 in steps of 1 |
| Pre-scale setting | 1 | Hex | 5 bits (pre-scale factor in Hex) |
| BR divisor | 521 | Decimal | 1 to 2048 in steps of 1 |
| BR divisor setting | 208 | Hex | 11 bits (BR divisor − 1 in Hex) |
| System clocks per transmission | 100032 | | Calculated = BR cycles per transmission * Pre-scale factor * BR divisor |
| Duration of transmission | 10.0032 | Msec | Calculated = System clocks per transmission * System clock period |

It is seen from Table 2 that, for the selected parameter values, the duration of transmission is slightly longer than the desired 10 msec interval by +0.032%. By choosing other parameter values, it is possible to attain different time intervals that approximate the desired 10 msec interval. For example, selecting 11 Bits per transmission results in 176 BR cycles per transmission. Then, setting BR divisor to be 568 results in 99968 System clocks per transmission for an interval of 9.9968 msec, which is slightly shorter than the desired 10 msec interval by −0.032%.

From the above examples, it can be seen that it is not always be possible to configure a communication resource precisely for an arbitrary time interval. The degree of accuracy, however, may be optimized by selecting different parameters, resulting in an interval suitable for many purposes that do not require a high degree of precision.

While the invention has been described with respect to a limited number of embodiments, it will be appreciated that many variations, modifications and other applications of the invention may be made.

It is intended that the present invention encompass such changes and modifications as fall within the scope of the appended claims.

What is claimed is:

1. A method of using a communication resource of a device to indicate an elapse of a specified time interval, the communication resource having a known bit clock period, the method comprising:
    initializing, at a controller, a counter to a specified value;
    preparing dummy data having a specified number of bits, the number of bits calculated by dividing the specified time interval by the known bit clock period;
    transmitting the data using the communication resource;
    detecting an interrupt from the communication resource upon completion of transmitting the data;
    upon detecting the interrupt from the communication resource, indicating the elapse of the specified time interval, wherein the indicating is utilized only for performing a timing operation external to the communication resource;
    upon completion of the transmitting, detecting, and indicating steps, decrementing the counter; and
    repeating the transmitting, detecting, indicating, and decrementing steps until the counter reaches zero.

2. The method of claim 1, wherein the device has at least one timer resource, and wherein all of the at least one timer resource are pre-allocated and none of the at least one timer resource is available to perform the timing operation.

3. The method of claim 1, wherein the data is not utilized after the transmitting.

4. The method of claim 1, wherein the data is not received.

5. The method of claim 1, wherein there is no receiver for the data.

6. The method of claim 1, wherein the data is arbitrarily selected.

7. The method of claim 1, wherein the transmitting is performed irrespective of a configuration of a receiver.

8. The method of claim 7, wherein the receiver has a timing rate, and wherein the transmitting is performed irrespective of the timing rate.

9. The method of claim 1, further comprising:
    initializing the communication resource to a basic clock frequency, wherein the basic clock frequency is a reciprocal of the known bit clock period.

10. The method of claim 9, further comprising:
    retriggering the transmitting upon the occurrence of the indicating; and
    performing the initializing of the communication resource a plurality of times using different values of the known bit clock period.

11. A computer program product comprising a non-transitory machine-readable medium encoded with computer-executable instructions that when executed cause a data processing system to perform the steps of:
    initializing a counter to a specified value;
    preparing dummy data having a specified number of bits, the number of bits calculated by dividing the specified time interval by the known bit clock period;
    transmitting the data using the communication resource;

detecting an interrupt from the communication resource upon completion of transmitting the data;

upon detecting the interrupt from the communication resource, indicating the elapse of the specified time interval, wherein the indicating is utilized only for performing a timing operation external to the communication resource;

upon completion of the transmitting, detecting, and indicating steps, decrementing the counter; and repeating the transmitting, detecting, indicating, and decrementing steps until the counter reaches zero.

12. A device comprising:

a communication resource, the communication resource having a known bit clock period; and a controller configured to:

initialize a counter to a specified value;

prepare dummy data having a specified number of bits, the number of bits calculated by dividing a specified time interval by the known bit clock period;

transmit the data using the communication resource;

detect an interrupt from the communication resource upon completion of transmitting the data;

upon detection of the interrupt from the communication resource, indicate an elapse of the specified time interval, wherein the indication is utilized only for performing a timing operation external to the communication resource;

upon completion of the transmission, detection, and indication steps, decrement the counter; and repeat the transmission detection, and indication steps until the counter reaches zero.

13. The device of claim 12, wherein the device has at least one timer resource, and wherein all of the at least one timer resource are pre-allocated and none of the at least one timer resource is available to perform the timing operation.

14. The device of claim 12, wherein the data is not utilized after the transmitting.

15. The device of claim 12, wherein the data is arbitrarily selected.

16. A method of using a communication resource of a device to measure an elapsed time during a specific condition, the communication resource having a known bit clock period, the method comprising:

initializing, at a controller, a counter to a first value;

preparing dummy data having a specified number of bits;

transmitting the data using the communication resource;

detecting an interrupt from the communication resource upon completion of transmitting the data;

incrementing the value of the counter upon detection of the interrupt;

repeating the transmitting, detecting, and incrementing steps until completion of the specific condition;

upon completion of the specific condition, multiplying the known bit clock period by the specified number of bits and the value of the counter to determine the elapsed time during the specific condition, wherein the elapsed time is determined only for performing timing operating which are external to the communication resource.

17. The method of claim 16, wherein the counter is initialized to zero.

18. The method of claim 16, wherein the data is not utilized after the transmitting.

19. The method of claim 16, wherein the data is arbitrarily selected.

20. The method of claim 16, wherein the data is not received.

* * * * *